US011420394B2

(12) United States Patent
Starkey et al.

(10) Patent No.: US 11,420,394 B2
(45) Date of Patent: Aug. 23, 2022

(54) 3D PRINTING SYSTEM

(71) Applicant: Sony Interactive Entertainment Inc., Tokyo (JP)

(72) Inventors: Robert Christopher Starkey, London (GB); Rohan Pankaj Bangdiwala, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 552 days.

(21) Appl. No.: 16/086,199

(22) PCT Filed: Feb. 16, 2017

(86) PCT No.: PCT/GB2017/050402
§ 371 (c)(1),
(2) Date: Sep. 18, 2018

(87) PCT Pub. No.: WO2017/163000
PCT Pub. Date: Sep. 28, 2017

(65) Prior Publication Data
US 2019/0358907 A1 Nov. 28, 2019

(30) Foreign Application Priority Data
Mar. 23, 2016 (GB) ..................... 1604950

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/118* (2017.08); *B29C 64/20* (2017.08);
(Continued)

(58) Field of Classification Search
CPC ..... B29C 64/393; B29C 64/118; B29C 64/20; B29C 64/106; B33Y 10/00; B33Y 30/00; B33Y 50/02
See application file for complete search history.

(56) References Cited

U.S. PATENT DOCUMENTS 5,737,467 A * 4/1998 Kato .................. G02B 6/30
385/78
7,964,439 B2 * 6/2011 Kim .................... B33Y 10/00
438/99
(Continued)

FOREIGN PATENT DOCUMENTS

CN 104943165 A 9/2015
EP 3002109 A1 4/2016
(Continued)

OTHER PUBLICATIONS

Office Action for corresponding CN Application No. 2017800195251, 18 pages, dated Jun. 16, 2020.
(Continued)

*Primary Examiner* — Jacob T Minskey
*Assistant Examiner* — Caroline Beha
(74) *Attorney, Agent, or Firm* — Matthew B. Dernier, Esq

(57) ABSTRACT

A 3D printing system comprises a 3D printing arrangement operable to print a 3D object, a processing unit operable to analyse images captured by an infra-red camera to detect the state of the object being printed, a substrate upon which the 3D printed object is adhered during the 3D printing process; and an infra-red light source arranged to illuminate the substrate in such a manner so as to cause total internal reflection of the infra-red light to occur in the substrate when the 3D object is not adhered to the substrate, wherein the infra-red camera is arranged to view the surface of the substrate opposite to that which the 3D object is printed upon so that the camera may capture images of the 3D object
(Continued)

when it is correctly adhered to the substrate; and the processing unit is operable to analyses the captured images to detect whether the 3D object is correctly adhered to the substrate.

11 Claims, 5 Drawing Sheets

(51) Int. Cl.
  *B33Y 30/00* (2015.01)
  *B29C 64/20* (2017.01)
  *B33Y 50/02* (2015.01)
  *B29C 64/118* (2017.01)

(52) U.S. Cl.
  CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 8,784,721 B2 | 7/2014 | Philippi | |
| 9,079,440 B1 | 7/2015 | Bonino | |
| 2004/0058407 A1* | 3/2004 | Miller | B01L 3/502715 435/29 |
| 2004/0133298 A1* | 7/2004 | Toyserkani | C23C 24/10 700/166 |
| 2004/0156539 A1* | 8/2004 | Jansson | G06T 7/0002 382/145 |
| 2005/0231713 A1* | 10/2005 | Owen | G01N 21/8806 356/237.1 |
| 2006/0160250 A1 | 7/2006 | Bonassar | |
| 2009/0128499 A1 | 5/2009 | Izadi | |
| 2009/0152771 A1 | 6/2009 | Philippi | |
| 2013/0328228 A1* | 12/2013 | Pettis | B29C 64/112 264/40.1 |
| 2014/0117575 A1 | 5/2014 | Kemperle | |
| 2015/0055085 A1* | 2/2015 | Fonte | H04L 65/403 351/178 |
| 2015/0277146 A1* | 10/2015 | Crespo | B29D 11/00951 264/1.36 |
| 2015/0306823 A1 | 10/2015 | Askedall | |
| 2016/0210737 A1* | 7/2016 | Straub | G05B 19/4099 |

FOREIGN PATENT DOCUMENTS

| | | |
|---|---|---|
| JP | 08166219 A | 6/1996 |
| JP | 2004537721 A | 12/2004 |
| JP | 2008215976 A | 9/2008 |
| JP | 2010520091 A | 6/2010 |
| JP | 2015196382 A | 11/2015 |
| WO | 33012408 A1 | 2/2003 |
| WO | 2016040453 A1 | 3/2016 |

OTHER PUBLICATIONS

Notification of Reasons for Refusal for corresponding JP Application No. 2018-550360, 3 pages, dated Nov. 4, 2020.
International Search Report and Written Opinion for corresponding PCT Application No. PCT/GB2017/050402, 15 pages, dated Jun. 28, 2017.
European Search Report for corresponding GB Application No. GB1604950.4, 6 pages, dated Sep. 26, 2016.
Examination Report for corresponding GB Application No. GB 1604950.4, 4 pages, dated Jul. 9, 2020.
Office Action for corresponding CN Application No. 2017800195251, 5 pages, dated Feb. 22, 2021.
Office Action for corresponding CN Application No. 201780019525. 1, 4 pages, dated Feb. 22, 2021.

\* cited by examiner

3D PRINTING SYSTEM

BACKGROUND OF THE INVENTION

Field of the Invention

The present disclosure relates to a 3D printing system.

DESCRIPTION OF THE PRIOR ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It will be appreciated that there are numerous technologies for 3D printing that are typically differentiated by how layers are built up to create a model. One technology is known as selective laser sintering (SLS), where a layer of powder is selectively fused together by a laser to create solid regions; a new layer of powder is then placed on top and the process repeats to build the model. Another technology is known as stereolithography, and uses a photo-reactive liquid in conjunction with one or more lasers to harden the liquid at defined points, thereby building the model, again typically in layers. Whilst both of these techniques are envisaged within the scope of embodiments of the present invention, they have the disadvantage of requiring both powerful lasers and large volumes of matrix material in the form of powder or liquid around the model, which make them less practical for domestic use. Consequently another technology is fused deposition modelling (FDM). This approach melts plastic in a printer head that moves over successive layers of the model, depositing droplets of plastic at selective positions in each layer in a manner similar to the deposition of droplets of ink by an inkjet printer on a sheet of paper. This avoids the need for lasers or a surrounding matrix of the raw material used by the model. Accordingly for the purposes of understanding an FDM 3D printer is briefly described below with reference to FIGS. 1A and 1B of the accompanying drawings.

FIG. 1A schematically shows a side elevation of a simple FDM 3D printer 100, whilst FIG. 1B schematically shows a plan view of the same FDM 3D printer. The printer 100 comprises a base structure 110 that provides a working surface for assembly of the printed model and support struts 102 upon which a printer frame 120 can be raised and lowered. The operational area of the 3D printer 100 defines a build chamber in which a 3D model is printed.

In an example mechanism, a motor 112Y is coupled to a drive bar 104 comprising a screw thread; a printer frame 120 then comprises a coupling section with a threaded hole and a smooth hole, the threaded hole being engaged with the drive bar and the smooth hole being engaged with one of the support struts. When, under instruction from a printer driver, the motor 112Y turns the drive bar in a clockwise or anticlockwise direction, the printer frame is moved up or down the drive bar and support strut (i.e. along the y-axis) and hence raises or lowers a printer carriage 130 attached to it.

As can be seen from FIG. 1B, the printer frame 120 is typically mounted on four support struts 102. Optionally a second motor, drive bar and coupling section may be provided at an opposing corner of the frame, to reduce strain on the frame and the motor.

The printer frame 120 supports the printer carriage 130. A motor 112X is coupled to a drive band 122 that is fixed by fixing device or arrangement 124 to the printer carriage 130. When, under instruction from a printer driver, the motor 112X rotates the drive band clockwise or anticlockwise, the printer carriage 130 is moved right or left along the printer frame 120 (i.e. along the x-axis) and hence moves an attached printer mechanism 140 laterally.

The printer carriage 130 supports the printer mechanism 140. A motor 112Z is coupled to a drive band 132 that is fixed by fixing device or arrangement 134 to the printer mechanism 140. When, under instruction from a printer driver, the motor 112Z rotates the drive band clockwise or anticlockwise, the printer mechanism 140 is moved in or out of a depth direction (i.e. along the z-axis).

The printer mechanism 140 itself comprises a heater for heating the end of one or more plastic threads fed into the mechanism (not shown), or for heating grains of plastic powder obtained from a hopper on the mechanism (not shown). The heating of the plastic or alternatively the release of heated plastic is controlled by instruction from a printer driver. A resulting bead or droplet of melted plastic is then deposited onto the working surface 110 of the printer or a partially built model (not shown) as applicable, through the printer head or nozzle 142.

In this way, under suitable instruction from a printer driver, the printer head can be positioned anywhere within a working volume of the 3D printer using motors 112X, Y, Z, and a droplet of plastic can be deposited at that position, which then cools and hardens to form a voxel of a 3D model. Through successive movement of the printer head and selective melting or release of plastic droplets, a completed 3D model can thus be built from a plurality of such voxels.

Typically the printer driver itself is a software module in a computer-aided design system that receives model geometry describing the 3D model. The printer driver then generates thin slices of the 3D model one voxel thick for each layer in the y direction, and determines the x, z coordinates for each voxel in that layer. The printer driver then outputs a sequence of instructions to the printer 100 to move the printer head 142 to the respective x, z coordinate for each voxel in layer y, where the printer mechanism is instructed to heat and/or release a droplet of plastic to form a voxel at that position. In this way the digital 3D model is rebuilt as a physical model by the 3D printer.

Numerous problems may be encountered when using such a system to manufacture 3D models; these are particularly notable as the scale of production (in terms of quantity of models produced) is increased.

One problem that is encountered is that of the requirement of constant supervision. When producing a 3D model it is beneficial to be able to observe production in order to identify any mistakes in the printing process before the manufacturing process progresses any further so as to reduce the amount of time and material wasted on producing faulty models. It is also advantageous to be able to have an operator available to observe the model and determine when the printing process is completed so as to be able to remove the completed model and begin the manufacturing process again to create a new model. However constant supervision may be both tedious for the supervising person as well as expensive for a large-scale manufacturer who would employ someone to supervise a printer, and as such an alternative arrangement is desirable.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
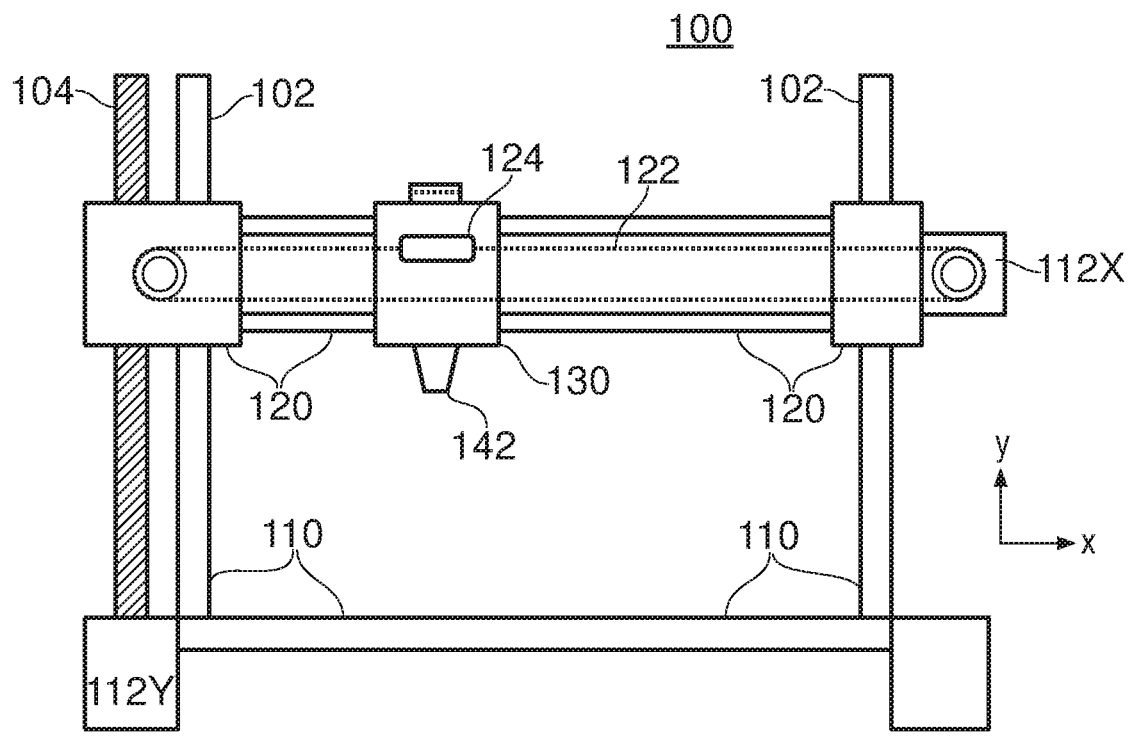
FIGS. 1A and 1B schematically illustrate a simple FDM printer.
Figure 1B:
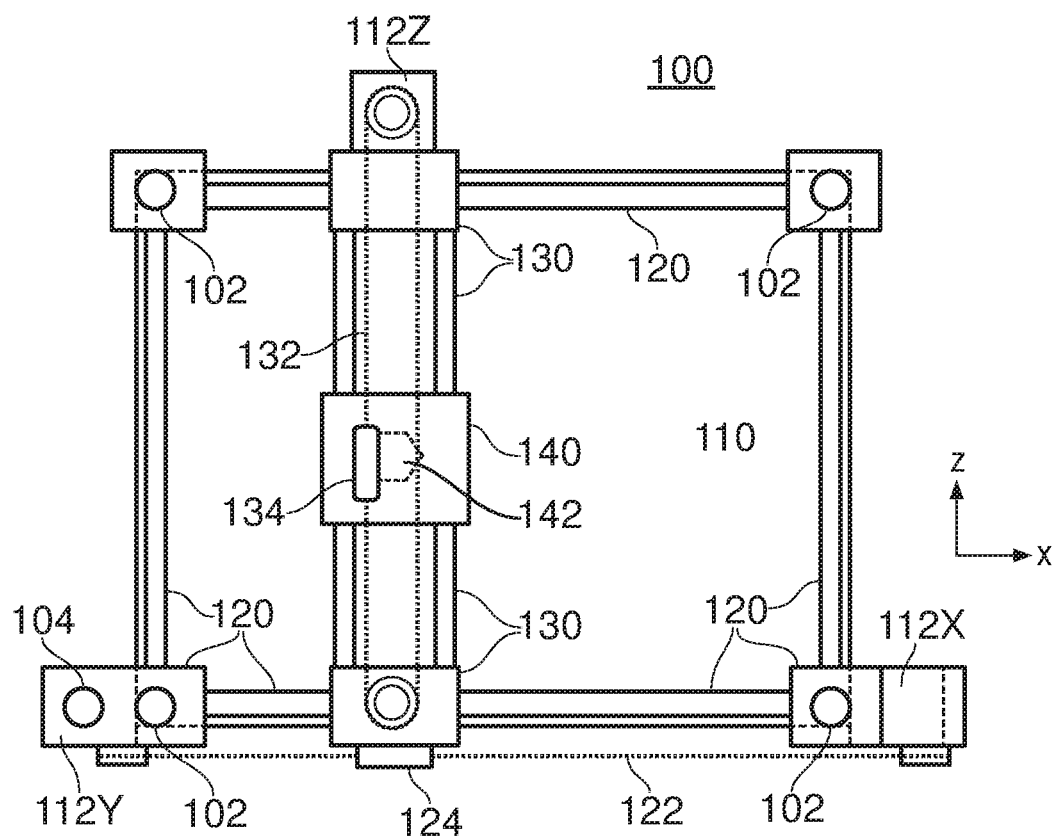
Figure 2:
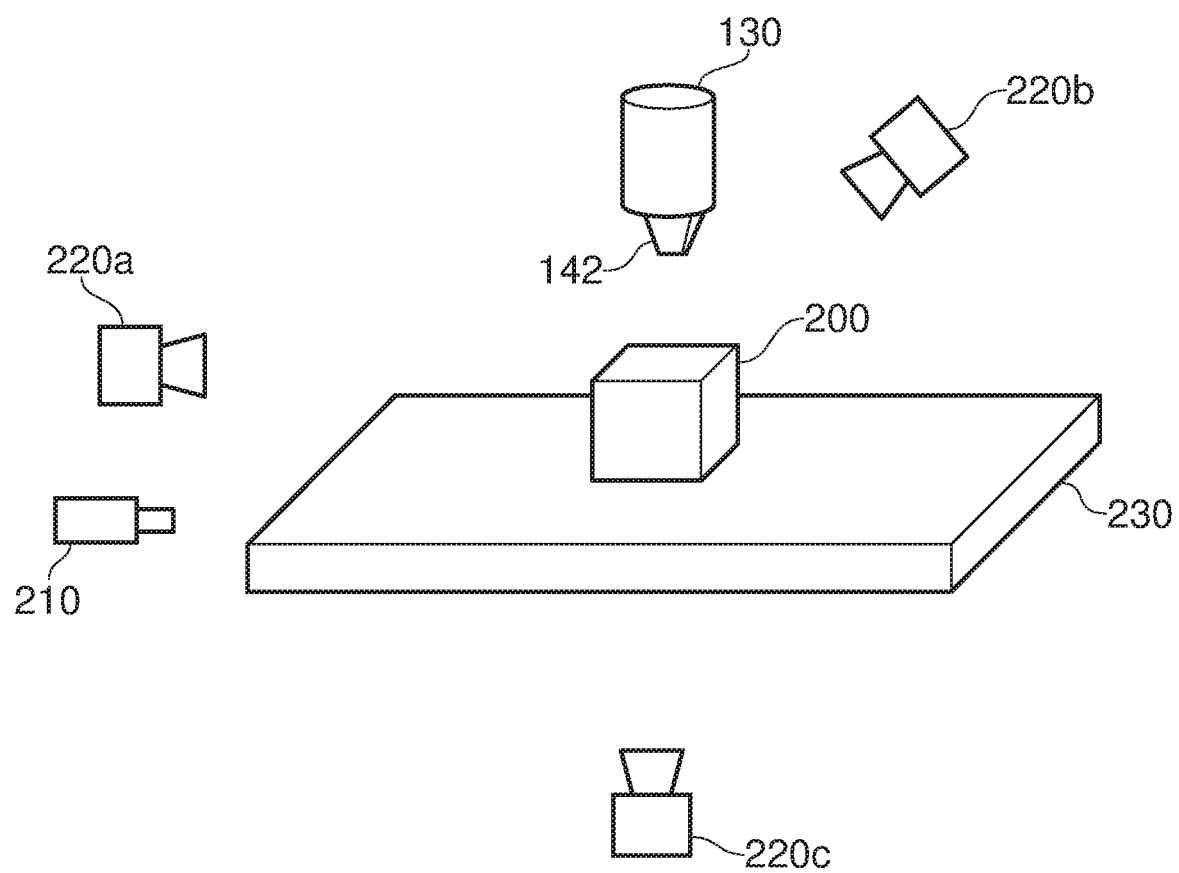
FIG. 2 schematically illustrates an FDM printer arrangement.

Referring now to the drawings, wherein like reference numerals designate identical or corresponding parts throughout the several views, FIG. 2 schematically illustrates an FDM printer arrangement that comprises an FDM printer, such as the printer 100 of FIGS. 1A and 1B, which is being used to manufacture the object 200. Several elements of the FDM printer 100 (including those which have already been described) have been omitted from this Figure for clarity. In this arrangement the working surface (also referred to as a substrate, in this disclosure) 230 is a heated substrate made of glass (for example) that is transparent or translucent to at least the particular frequency of infra-red (IR) light that is emitted by the IR light source 210. This light source is typically formed as an LED, but may be implemented as a bulb, laser or any other appropriate source. This arrangement also comprises a plurality of cameras 220a, 220b and 220c that are sensitive to IR light. The cameras 220a and 220b are arranged so as to be able to capture a substantially unobstructed view of the object 200, whilst the camera 220c is arranged so as to have the substrate 230 in the path of its view of the object 200.

The cameras 220a and 220b are able to image the object 200 as it is being manufactured, as IR radiation is emitted as the heated plastic is added to the object as part of the manufacturing process. Images of the object 200 during the manufacturing process may be compared to models describing the manufacturing process in order to check that no substantial errors have been made. Such a monitoring and comparison method will be discussed in more detail below.

Figure 3A:
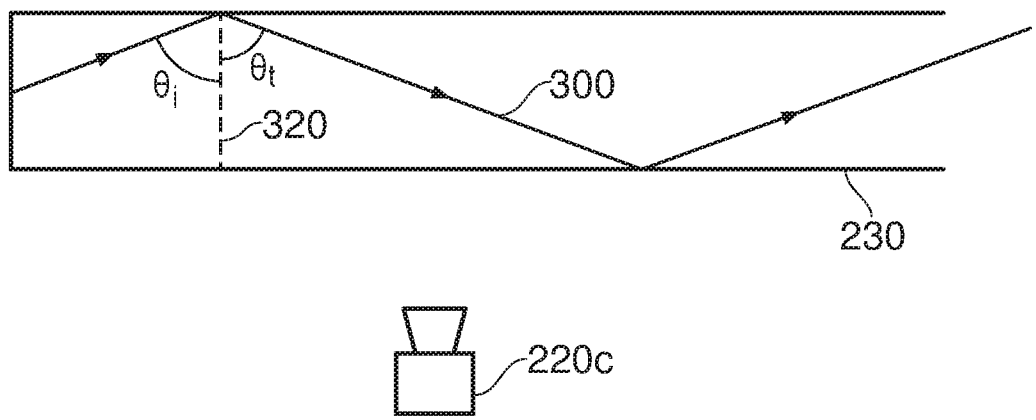
FIG. 3A schematically illustrates total internal reflection in a substrate.

FIG. 3A schematically illustrates a portion of the substrate 230 with a light ray 300 being transmitted through the substrate, with arrows on the light ray 300 indicating a direction of travel. The dashed line 320 indicates the normal to the substrate-air interface as it extends into the substrate. The light ray 300 is emitted by the IR light source 210 of FIG. 2. The choice of material from which the substrate 230 is formed (in conjunction with the properties of a surrounding material, for example the air around the substrate 230) defines a critical angle of incidence above which total internal reflection occurs; the angle of incidence here refers to the angle at which the light ray 300 strikes the boundary of the substrate 230 (wherein the boundary of the substrate 230 defines the interface between two media, for example a substrate/air interface). The critical angle is defined as the incident angle at which a light ray is no longer transmitted across an interface between two media, and is calculated using Snell's Law:

$$n_1 \sin \theta_i = n_2 \sin \theta_t$$

in which $n_1$ is the refractive index of the medium in which the light ray is travelling (here, the substrate 230), $\theta_i$ is the incident angle of the light ray upon the interface between the two media, $n_2$ is the refractive index of the medium on the other side of the interface (here, the air surrounding the substrate 230), and $\theta_t$ is the angle of the light ray as it leaves the interface between the two media (the angle of transmission). Total internal reflection occurs when the angle of transmission is 90°, the sine of which is 1. Therefore, the critical angle $\theta_c$ is defined as:

$$\theta_c = \theta_i = \sin^{-1}\left(\frac{n_2}{n_1}\right)$$

It is apparent from this equation that the critical angle for an interface between two media varies in dependence upon the relative refractive indices of the two media.

In the above-described arrangement, total internal reflection therefore means that the light ray 300 is unable to be transmitted from the substrate 230 into the surrounding air. The light ray 300 is therefore effectively 'trapped', and as a result will not be detectable by the camera 220c.

Figure 3B:
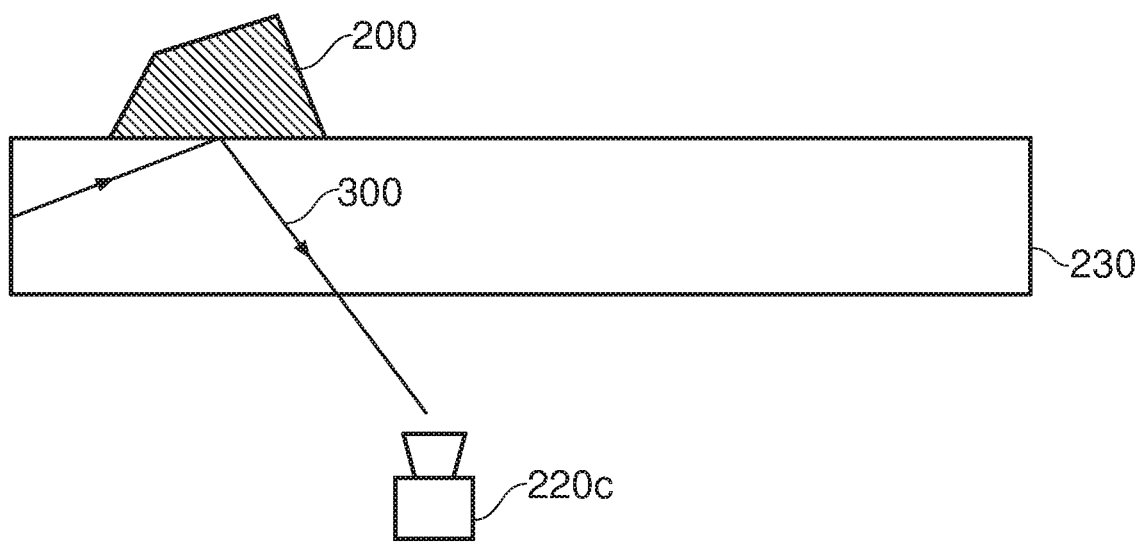
FIG. 3B schematically illustrates frustrated total internal reflection in a substrate.

FIG. 3B schematically illustrates a corresponding scenario in which the first (i.e. bottom) layer of the object 200 has been properly adhered to the substrate. When the first layer of the substrate is correctly adhered to the substrate a substrate/model interface is created, replacing the substrate/air interface that was previously present at the location of the object 200. This causes the critical angle and the angle of reflection to vary in accordance with the above equations, and total internal reflection may be prevented. One method by which this may occur is described as 'frustrated total internal reflection', in which if the object 200 is close enough to the substrate 230 (a distance of the order of the wavelength of the light ray) transmission of energy of the light ray 300 across the boundary occurs. This allows the light ray 300 (or some component of the light ray 300) to interact with the object 200 which will have a reflective index that is different to that of the surrounding air. This will cause the light ray 300 to be reflected at a different angle to that at the interface where the object 200 is not present. As the object 200 will generally have a higher reflective index than the surrounding air, the new reflected angle will be smaller and therefore may no longer satisfy the angular requirement for total internal reflection to occur in the substrate 230. This may therefore allow the light ray 300 to be detected by the camera 220c, as the light ray 300 will no longer meet the angular condition for total internal reflection to occur and thus the light ray 300 may escape from the substrate 230 as is schematically illustrated in FIG. 3B.

In such an arrangement it is considered that the camera 220c will only receive light from the light source 210 when the object 200 is correctly adhered to the substrate 230, as this is the likely reason for frustrated total internal reflection to occur. The use of the camera 220c and the light source 210 therefore provides the current arrangement with the ability to confirm that the adhesion of the object 200 to the substrate 230 (an important step in printing the object 200) has been performed correctly, as well as providing the ability to locate the object 200 on the substrate 230. In response to a detection that the adhesion has not been performed correctly, or that the object 200 has become detached during the printing process, the printing process may be restarted or any other appropriate action may be taken. In response to a detection that the object 200 is not correctly adhered to the substrate 230 in the expected location, information about the actual position may be provided to the printer, for example in order to apply a correction to the printing process or to cause the printing process to be restarted.

Figure 4:
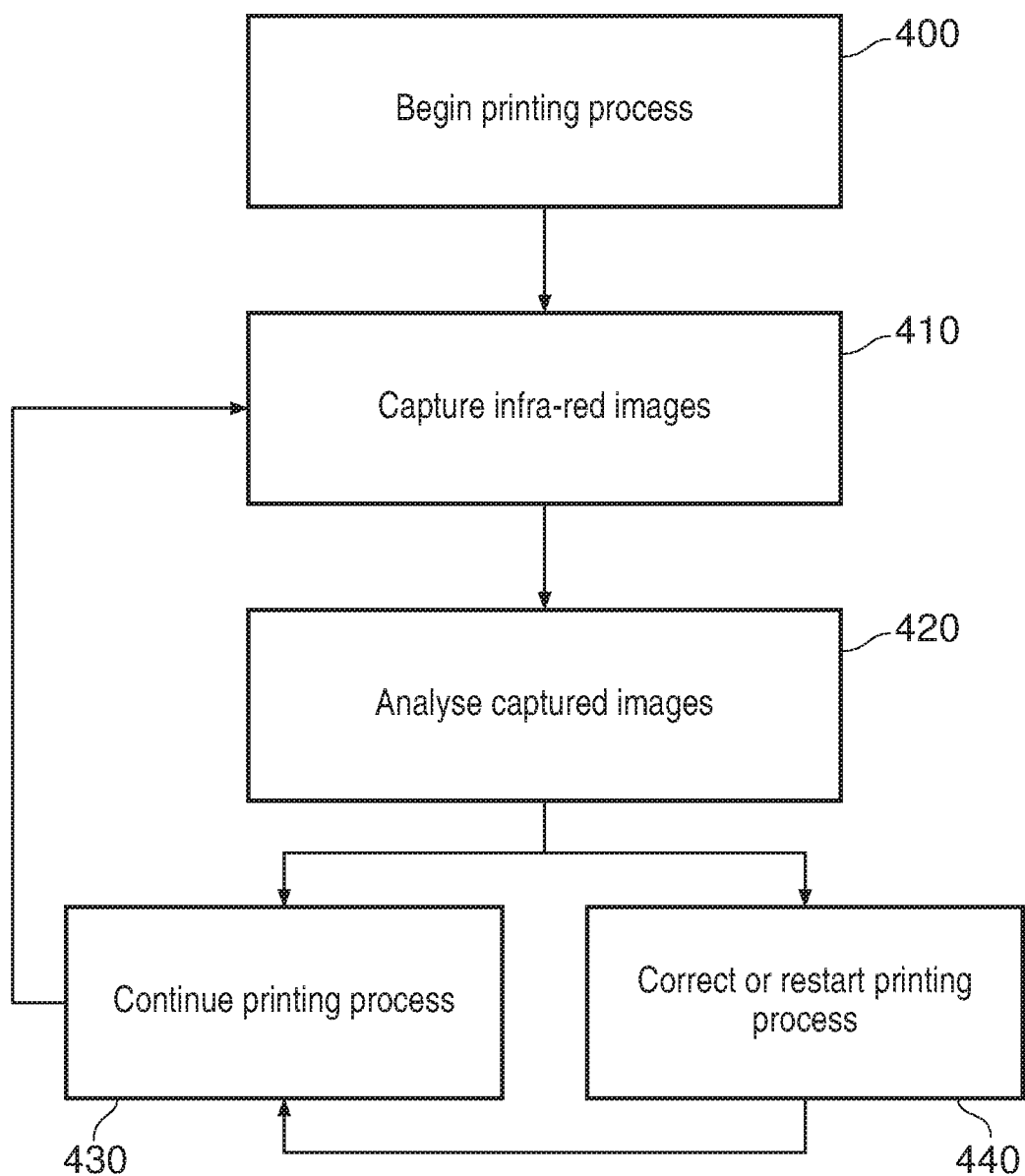
FIG. 4 schematically illustrates a method for performing a 3D printing process.

FIG. 4 schematically illustrates a method for performing a 3D printing process in which images of the model being printed is checked for faults throughout the printing process.

The method starts at a step 400 in which the printing process is started. This step may include, or be preceded by, determining a 3D model that is to be printed and setting any operating parameters of the 3D printing arrangement such as temperature and pressure of the build chamber. The step 400 can comprise printing a portion of a 3D object using a 3D printer.

At a step 410 IR images of the object being printed are captured by the array of IR cameras 220a, 220b and 220c as described above. The object 200 emits IR radiation as a result of heated plastic being used to print the object. The difference in temperature between the most-recently printed part of the object and previously printed parts of the object may make tracking the progress of the printing easier as the newly-added material may be easily identified in the captured images by its heat signature. By using stereoscopic cameras, or a suitable array of cameras, the position of the object being printed can be determined in three dimensions.

At a step 420 these captured images are analysed to detect the state of the 3D object, for example to identify errors in the printing process and/or to identify completion of the printing process. This analysis may take any appropriate form, for example the shape of the object being printed could be compared to a model of the design being printed. The model for comparison may be a complete model of the object being printed, alternatively (or in addition) one or more partial models corresponding to different levels of partial completion of the 3D printing process could be provided to act as a series of checkpoints against which the printing results can be compared.

Alternatively, or in addition, a real-time process could be performed in which the control software compares the instructions it provides to the 3D printing arrangement with images captured of the model being printed. As described above, it is possible to identify recently printed areas in an image and information about these areas may be compared with the printing instructions for the 3D printing process to determine whether or not the printing is sufficiently accurate to meet predetermined threshold standards.

If the analysis of the captured images at the step 420 determines that there is no unacceptable printing error, then the method proceeds to a step 430 in which the printing process is continued, or alternatively ended if there is no more printing to be performed. If the printing is continued, the method returns to the step 410 in which further IR images of the object being printed are captured.

Examples of unacceptable printing errors include the 3D object not having the expected shape at the current stage of printing, or the 3D object not being correctly adhered to the substrate upon which it is being printed. The tolerance of the 3D printing arrangement to such errors may be selected in dependence upon the intended use of the 3D object itself, for example a toy could have a larger tolerance for error than a 3D object that is intended to be used for scientific experiments, or any other appropriate factor. The tolerance for error could also vary in dependence upon the location of the error; a small error on the top of the 3D object that is only cosmetic may be more acceptable than a similar error on the base of the 3D object which causes structural problems or further mistakes to be made due to a dependence on the lower parts of the 3D object to be correctly printed so that layers may be added on top correctly, for example.

If instead the analysis of the captured images at the step 420 determines that there is an unacceptable printing error, the printing process may be restarted at the step 440. This comprises removing the partially printed object from the printer and starting the printing process from the step 400. Alternatively, if the error is correctable then adjustments could be made to the printing process before proceeding to the step 430 and continuing printing the object.

In either case at the step 440, any number of operating parameters of the 3D printer may be varied in response to a detected error in the printing of an object; these changes may be implemented either before continuing with the current printing process or before starting the new printing process. The variation of the operating parameters of the 3D printer may comprise one or more of the following list:

adjusting the level of active cooling applied to the print process, for example by varying a fan speed;

adjusting the atmospheric conditions of the build chamber, for example the temperature or humidity;

adjusting the temperature of the plastic being applied to the object being printed;

adjusting the print speed;

adjusting the layer height, line thickness, strength or any other printing parameter; and adjusting the substrate temperature, which may also require a corresponding adjustment of the light source intensity in order to maintain functionality.

This list of operational parameters is not exhaustive, and the variation of the operating parameters of the 3D printer may also or otherwise include the adjustment of any other appropriate operating parameters. Alternatively, or in addition, an alarm may be used to signal a human operator to intervene and make an independent assessment and/or adjustment of the operating parameters in addition to taking any other appropriate actions with regards to the 3D printing process.

The selection of which of the above adjustments to make may be determined based upon the results of the analysis of the captured images. For example, if a greater-than-expected amount of IR radiation is captured from the base of the object and/or the shape at the bottom of the object is disfigured then it would be apparent that the substrate is too hot and the temperature should be lowered. Appropriate adjustments may correspond to any detected image features in this manner, and it may also be the case that a detected problem may be corrected by implementing any of more than one of the adjustments listed above; for example increasing the level of active cooling applied to the printed object may have a comparable effect to decreasing the temperature of the build chamber.

Applying the adjustments may be an iterative process in which adjustments may be implemented successively. This may be to establish the magnitude of the adjustment that should be applied, for example such that several adjustments of a 1° C. are made that converge on a suitable temperature rather immediately being able to calculate the exact change in temperature required. Alternatively, this may be because a variation of the operating parameters of the 3D printer is an adjustment of a complex system and as a result other operating parameters may need to be varied in order to achieve a suitable correction to the 3D printing process. For example lowering the temperature of the substrate may solve the problem of the base of the 3D object being too hot, but this may lead to a cooling of the build chamber which in turn could cause other problems in the printing process and therefore other operating parameters would need to be adjusted separately to account for this.

By implementing such a method the printing process may be largely automated, so that human intervention is only required rarely, if at all.

Figure 5:
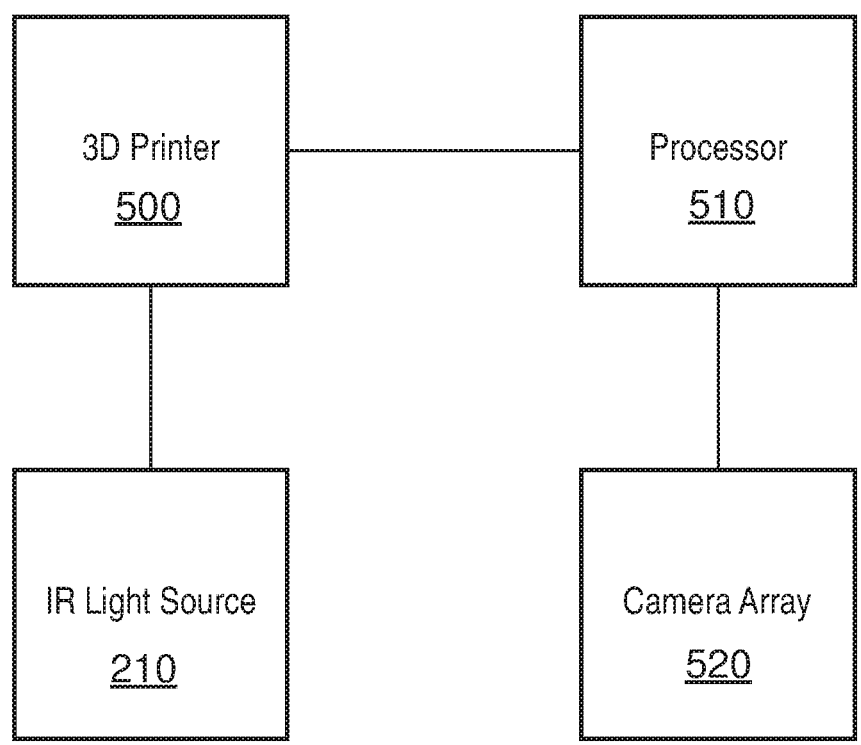
FIG. 5 schematically illustrates a 3D printing system.

FIG. 5 schematically illustrates a 3D printing system. This system comprises a 3D printer 500, a processor 510, and a camera array 520. Optionally, an IR light source 210 is also provided.

In some embodiments the 3D printer 500 may be the same as the 3D printer 100 illustrated in FIGS. 1A and 1B. However it may also have various features not found in the arrangement described with reference to FIGS. 1A and 1B, such as the substrate 230 that is described with reference to FIG. 2. The 3D printer 500 is an example of a 3D printing arrangement that is operable to print a 3D object.

The optional IR light source 210 is arranged so as to interact with the 3D printer 500 as described above with reference to FIG. 2. In embodiments in which the IR light source 210 is provided, it is arranged to illuminate the substrate 230 of the 3D printer 500 in such a manner so as to cause total internal reflection of the infra-red light to occur in the substrate 230 when a 3D object is not adhered to the substrate 230. In an embodiment in which the IR light source 210 is provided a camera of the camera array 520 is arranged to view the surface of the substrate 230 opposite to that which the 3D object is printed upon.

The processor 510 is operable to analyse images of the 3D object captured by the array of infra-red cameras to detect the state of the object being printed. In other words, the processor 510 is operable to control (and receive data from) the camera array 520 and perform an analysis of the images captured by the camera array 520. This analysis of images of the 3D object captured by the camera array 520 may comprise the identification of errors in the 3D printing process by the processor 510. Alternatively, or in addition, the analysis of images of the 3D object captured by the camera array 520 is used to identify completion of the 3D printing process. The processor 510 may then provide instructions to the 3D printer in response to the results of this analysis.

The analysis performed by the processor 510 is discussed above with reference to FIG. 4. The analysis may comprise comparing captured images to a model of the 3D object, or a model of a portion of the 3D object. Alternatively, or in addition, the comparison may be made with respect to a model of a partially-completed 3D object. In some embodiments, the analysis of the captured images comprises comparing captured images to printing instructions for printing the 3D object; this may be performed instead of or in conjunction with the comparison to a model of the 3D object.

The camera array 520 comprises one or more IR cameras such as those 220a, 220b and 220c in FIG. 2. The camera array 520 is operable to capture images of the 3D object being printed by the 3D printer 500, and provides these images to the processor 510 for analysis. The cameras in the camera array 520 may each capture stereoscopic images in embodiments of the present disclosure.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A 3D printing system, the system comprising:
a 3D printing arrangement operable to print a 3D object;
a processing unit operable to analyse images captured by an infra-red camera to detect the state of the object being printed;
a substrate upon which the 3D printed object is adhered during the 3D printing process; and
an infra-red light source arranged to illuminate the substrate in such a manner so as to cause total internal reflection of the infra-red light to occur in the substrate, effectively trapping the infra-red light within the substrate when the 3D object is not adhered to the substrate; wherein
when the 3D printed object, which has a different refractive index to surrounding air, is correctly adhered to the substrate that has a different refractive index to surrounding air, causing the light to be reflected at a different angle not satisfying an angular requirement for total internal reflection to occur and so allowing the light to be detected by the infra-red camera;
the infra-red camera is arranged to view the surface of the substrate opposite to that which the 3D object is printed upon so that the camera may capture images of the 3D object when it is correctly adhered to the substrate, and
the processing unit is operable to analyses the captured images to detect whether the 3D object is correctly adhered to the substrate.

2. A 3D printing system according to claim 1, comprising an array of infra-red cameras operable to capture images of the 3D object being printed by the 3D printing arrangement.

3. A 3D printing system according to claim 2, wherein the processing unit is configured to use the analysis of images of the 3D object captured by the array of infra-red cameras to identify errors in the 3D printing process.

4. A 3D printing system according to claim 2, wherein the processing unit is configured to use the analysis of images of the 3D object captured by the array of infra-red cameras to identify completion of the 3D printing process.

5. A 3D printing system according to claim 2, wherein the infra-red cameras are configured to capture stereoscopic images.

6. A 3D printing system according to claim 2, wherein the analysis of the captured images comprises a comparison of captured images to a model of the 3D object.

7. A 3D printing system according to claim 6, wherein the model of the 3D object is a model of a partially-completed 3D object.

8. A 3D printing system according to claim 6, wherein the analysis of the captured images comprises comparing captured images to printing instructions for printing the 3D object.

9. A 3D printing system according to claim 1, wherein if an error in the 3D printing process is identified the 3D printing process is restarted.

10. A 3D printing system according to claim 2, wherein operating parameters of the 3D printing arrangement are adjusted in response to the analysis of the captured images.

11. A non-transitory, computer-readable storage medium which stores computer software, which when executed by a computer, causes the computer to carry out actions, comprising:

printing a portion of a 3D object using a 3D printer;

providing a substrate upon which the 3D printed object is adhered during the 3D printing process; and arranging an infra-red light source to illuminate the substrate in such a manner so as to cause total internal reflection of the infra-red light to occur in the substrate, effectively trapping the infra-red light within the substrate when the 3D object is not adhered to the substrate; wherein when the 3D printed object, which has a different refractive index to surrounding air, is correctly adhered to the substrate that has a different refractive index to surrounding air, causing the light to be reflected at a different angle not satisfying an angular requirement for total internal reflection to occur and so allowing the light to be detected by the infra-red camera;

viewing the surface of the substrate opposite to that which the 3D object is printed upon with an infra-red camera so that the camera may capture images of the 3D object when it is correctly adhered to the substrate, and analysing the captured images to detect whether the 3D object is correctly adhered to the substrate.

* * * * *